(12) United States Patent
Ito et al.

(10) Patent No.: US 12,538,927 B2
(45) Date of Patent: Feb. 3, 2026

(54) FISH SEDATING DEVICE

(71) Applicant: NISHINIHON NICHIMO CO.,LTD., Shimonoseki (JP)

(72) Inventors: Sho Ito, Tokyo (JP); Ryosuke Tanaka, Shimonoseki (JP)

(73) Assignee: NISHINIHON NICHIMO CO., LTD., Shimonoseki (JP)

( * ) Notice: Subject to any disclaimer, the term of this patent is extended or adjusted under 35 U.S.C. 154(b) by 0 days.

(21) Appl. No.: 18/684,776

(22) PCT Filed: Apr. 28, 2022

(86) PCT No.: PCT/JP2022/019394
§ 371 (c)(1),
(2) Date: Feb. 19, 2024

(87) PCT Pub. No.: WO2023/026590
PCT Pub. Date: Mar. 2, 2023

(65) Prior Publication Data
US 2024/0381880 A1    Nov. 21, 2024

(30) Foreign Application Priority Data
Aug. 21, 2021 (JP) .................... 2021-135251

(51) Int. Cl.
*A22B 3/06* (2006.01)
*A22B 3/08* (2006.01)

(52) U.S. Cl.
CPC ............. *A22B 3/06* (2013.01); *A22B 3/083* (2013.01)

(58) Field of Classification Search
CPC .................... A22B 3/06; A22B 3/083
USPC .................................... 452/58, 59
See application file for complete search history.

(56) References Cited

U.S. PATENT DOCUMENTS

| | | | |
|---|---|---|---|
| 2,722,036 A | 11/1955 | Servidio | |
| 5,253,610 A * | 10/1993 | Sharber | A01K 61/90 119/200 |
| 5,800,257 A * | 9/1998 | Craig | A01K 79/02 452/1 |
| 6,132,303 A * | 10/2000 | Buckhaven | A22B 3/06 452/1 |
| 6,134,824 A * | 10/2000 | Gleeson | A01K 79/02 43/17.1 |
| 9,210,942 B2 * | 12/2015 | Holliman | A01K 61/00 |
| 9,370,194 B2 * | 6/2016 | McKimm | A22B 3/083 |

FOREIGN PATENT DOCUMENTS

JP        7-298829 A        11/1995

OTHER PUBLICATIONS

International Search Report mailed on Jun. 14, 2022 in PCT/JP2022/019394 filed on Apr. 28, 2022 (2 pages).

* cited by examiner

*Primary Examiner* — David J Parsley
(74) *Attorney, Agent, or Firm* — Oblon, McClelland, Maier & Neustadt, L.L.P.

(57) ABSTRACT

A fish sedation device that reliably energizes and sedates fish and enables a slaughter operation to be satisfactorily performed by energizing fish on a mat from electrodes via high resistance water which has a higher electrical resistance than that of the fish.

5 Claims, 3 Drawing Sheets

FISH SEDATING DEVICE

CROSS REFERENCE TO RELATED APPLICATIONS

This application is a National Stage entry under 35 U.S.C. § 371 of PCT/JP2022/019394, filed on Apr. 28, 2022, and claims priority to JP Patent Application No. 2021-135251, filed on Aug. 21, 2021, the entire contents of which are incorporated herein by reference.

TECHNICAL FIELD

The present invention relates to a fish sedating device, and more particularly to a fish sedating device suitable for sedating a fish when slaughtering landed live fish.

BACKGROUND ART

Generally, when a fish thrashes when landed, lactic acid is stored in a body of the fish, or the fish is bruised, resulting in a degraded quality. Accordingly, to sedate a fish to be landed, the fish has been conventionally sedated using an electric shock.

For example, there has been proposed a method for supplying electricity between electrodes installed in water and delivering an electric shock to fish present between the electrodes to sedate the fish.

As an example, in seawater, the seawater has a higher electrical conductivity than that of fish. Therefore, even if electricity is merely supplied between electrodes, an electric current does not easily flow through a fish in the seawater. Accordingly, it has been proposed that electricity is supplied to a net portion having an electrode function capable of energizing a fish in water to deliver an electric shock to a fish swimming near the net portion to sedate the fish, take the fish in a sedated state into the net portion, and take the fish out of the water (see PTL 1).

It has also been proposed that after a plurality of fish each having a spine are collectively scooped up from under the sea using a landing net, and all the fish are taken out of the sea into the air, electricity is supplied to two electrodes installed in the landing net to energize all the fish through seawater adhering to a surface of a body of each of the fish, to electrify and sedate the fish to such an extent that the spine is not damaged and deliver the fish in a sedated state from the landing net to a subsequent process (see PTL 2).

To hold freshness of a live fish that has been landed, a slaughter operation is frequently performed. To prevent the live fish from thrashing in the slaughter operation, it has also been proposed that the live fish is placed on a urethane mat, for example, and electricity is supplied between electrodes installed on the urethane mat to sedate the live fish.

CITATION LIST

Patent Literature

PTL 1: Japanese Patent Laid-Open No. 2012-165720
PTL 2: Japanese Patent Laid-Open No. 2017-018028

SUMMARY OF THE INVENTION

Problems to be Solved by the Invention

When the live fish placed on the urethane mat is energized to continue the slaughter operation, as described above, the electrodes for energization are electrically connected to each other through so-called water including mucus adhering to the live fish, both or one of seawater and fresh water, or the like, and an electric current mainly flows through low-resistance water in a state having a higher electrical conductivity than that of the live fish, resulting in a disadvantage that the live fish is not energized.

The present invention has been made in view of such points, and has as its object to provide a fish sedating device capable of reliably energizing and sedating fish to satisfactorily perform a slaughter operation.

Means for Solving the Problems

To attain the above-described object, a fish sedating device according to a first aspect of the present invention includes fish placement means on which fish can be placed, a pair of electrodes that energizes the fish placed on the fish placement means through high-resistance water in a state present on the fish placement means and having a higher electrical resistance than that of the fish, and a power source that supplies electricity to the electrode.

When such a configuration is adopted, the fish placed on the fish placement means can be reliably energized and sedated by passing the electrode therethrough through the high-resistance water in the state present on the fish placement means and having the higher electrical resistance than that of the fish, thereby making it possible to satisfactorily perform a slaughter operation.

A fish sedating device according to a second aspect of the present invention includes fish placement means on which fish can be placed, a pair of electrodes that energizes the fish placed on the fish placement means through high-resistance water in a state present on the fish placement means and having a higher electrical resistance than that of the fish, a power source that supplies electricity to the electrodes, and water storage prevention means for preventing resistance-reducing water for reducing an electrical resistance between the electrodes from being stored on the fish placement means.

When such a configuration is adopted, the water storage prevention means prevents the resistance-reducing water for reducing the electrical resistance between the electrodes from being stored on the fish placement means. Therefore, the fish placed on the fish placement means can be reliably energized and sedated by passing the electrode therethrough, thereby making it possible to satisfactorily perform a slaughter operation.

In the fish sedating device according to a third aspect of the present invention, the resistance-reducing water includes at least one of mucus of the fish, seawater, and fresh water in the first or second aspect.

When such a configuration is adopted, the water storage prevention means moderately removes the resistance-reducing water including mucus adhering to an outer surface of the fish or mucus to be discharged from inside a body of the fish, seawater or fresh water to be brought in simultaneously when the fish is placed on the fish placement means, seawater or fresh water that may be provided for a slaughter operation, and the like. Therefore, the fish placed on the fish placement means can be reliably energized and sedated by passing the electrode therethrough, thereby making it possible to satisfactorily perform a slaughter operation.

In the fish sedating device according to a fourth aspect of the present invention, the water storage prevention means includes at least one of being formed by providing a large number of water-passing holes in a thickness direction of the fish placement means, being formed by providing vacuum means for forcibly discharging the resistance-reducing water by the fish placement means, and being formed by providing a water-repellent function to the fish placement means in any one of the first to third aspects.

When such a configuration is adopted, the water storage prevention means in any form moderately removes the resistance-reducing water at least in the vicinity of the fish on the fish placement means. Therefore, the fish on the fish placement means can be reliably energized and sedated by passing the electrode therethrough, thereby making it possible to satisfactorily perform a slaughter operation.

In the fish sedating device according to a fifth aspect of the present invention, the fish placement means has elasticity and is formed to widely contact a lower surface on the placement side of the placed fish in any one of the first to fourth aspects.

When such a configuration is adopted, the lower surface on the placement side of the fish placed on the fish placement means having elasticity and an upper surface of the fish placement means elastically deformed widely contact each other. Therefore, the fish on the fish placement means can be reliably energized and sedated by passing the electrode therethrough, thereby making it possible to satisfactorily perform a slaughter operation.

Effects of the Invention

With a fish sedating device according to the present invention, fish can be reliably energized and sedated to satisfactorily perform a slaughter operation.

BRIEF DESCRIPTIONS OF THE DRAWINGS

DETAILED DESCRIPTION OF PREFERRED EMBODIMENTS

Figure 1:
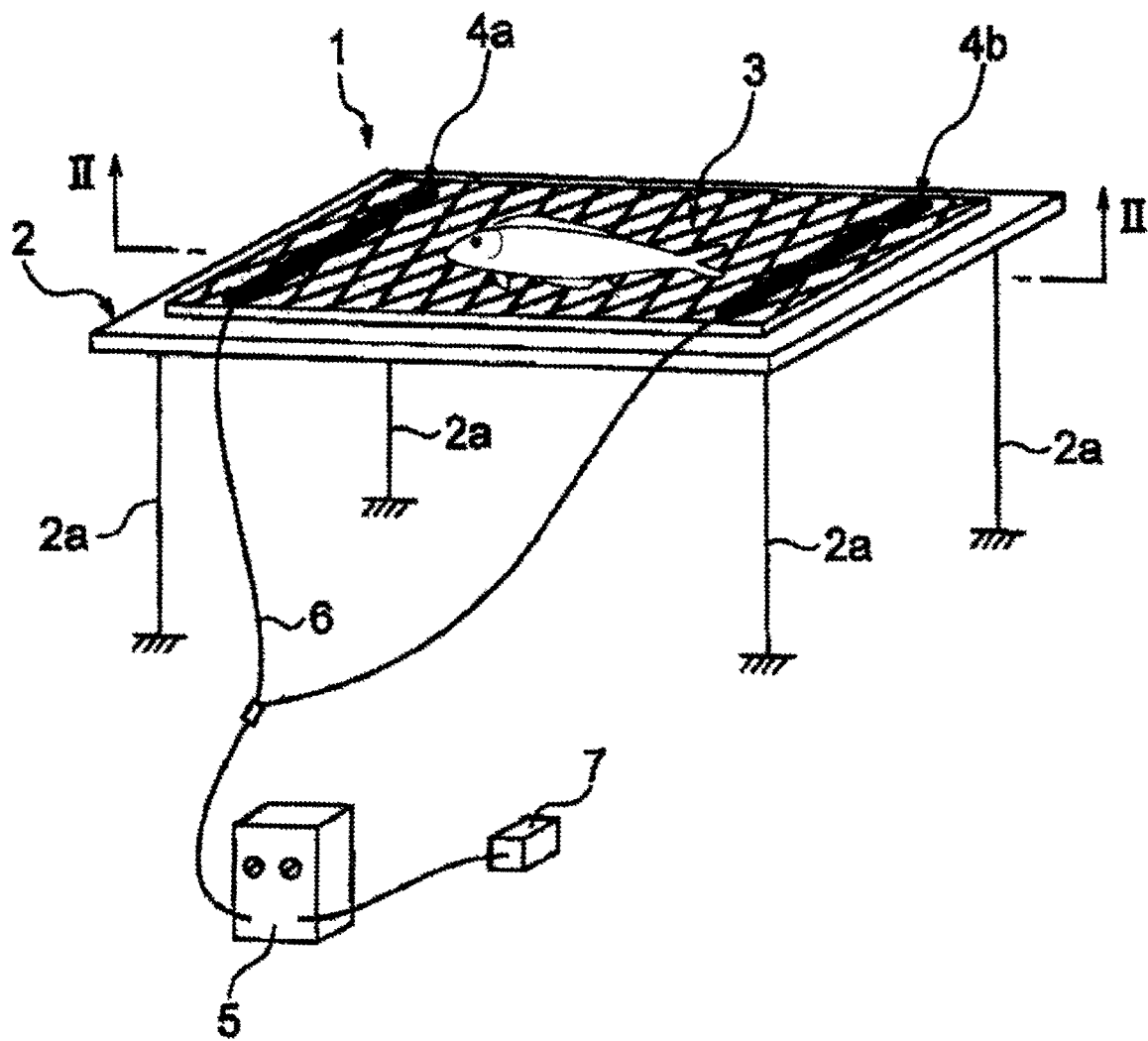
FIG. 1 is a schematic perspective view illustrating an embodiment of a fish sedating device according to the present invention.
Figure 2:
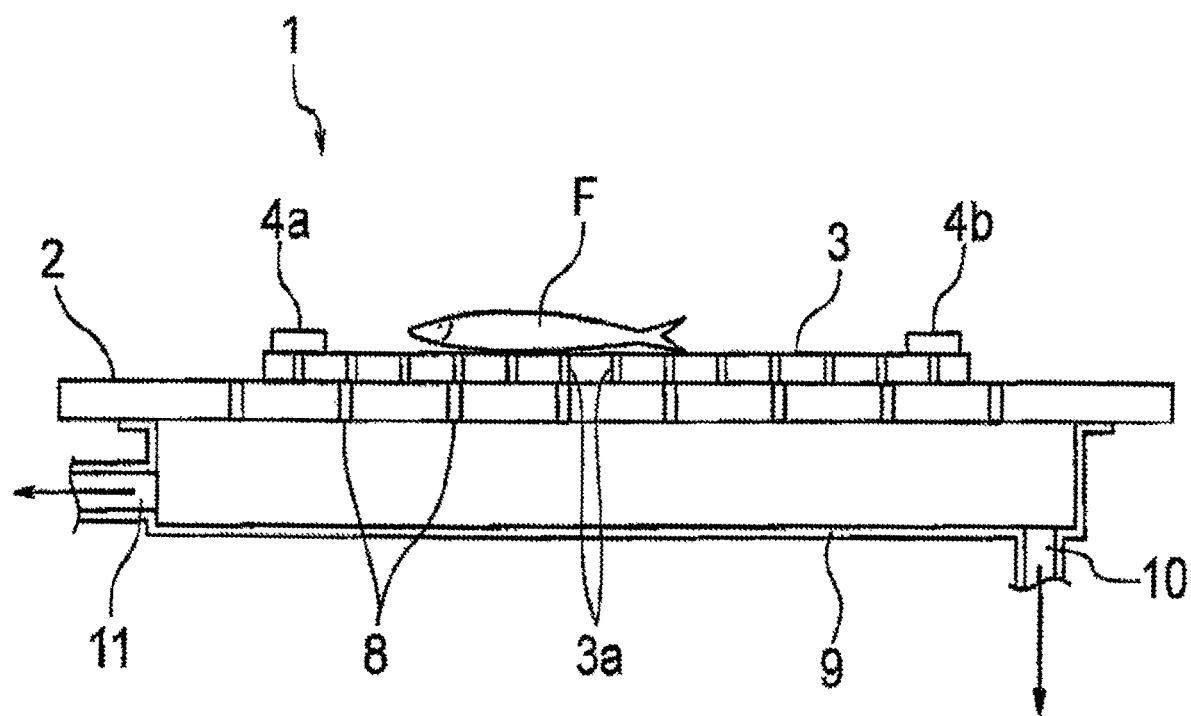
FIG. 2 is an enlarged sectional view taken along a line II-II illustrated in FIG. 1.
Figure 3:
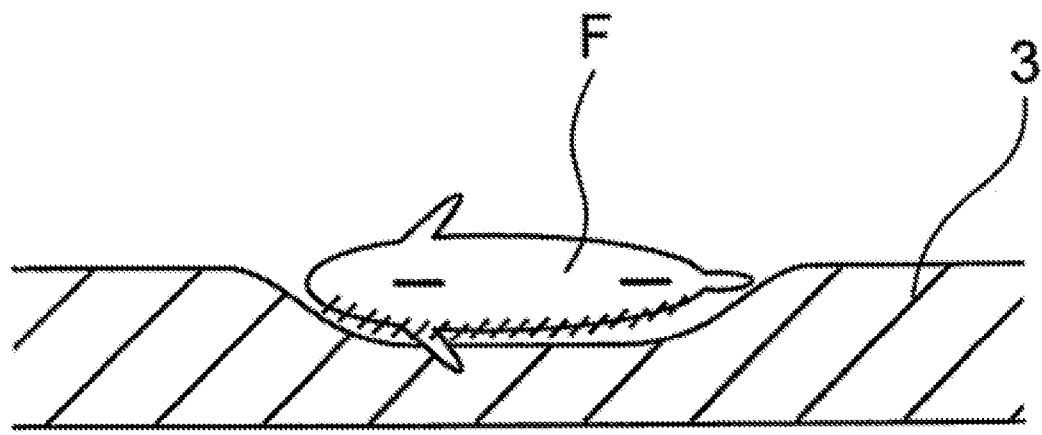
FIG. 3 is a cross-sectional view illustrating a state of a mat elastically deformed with a fish placed thereon.

FIGS. 1 to 3 illustrate an embodiment of the present invention. A fish sedating device 1 is installed on a deck of a fishing boat not illustrated as an example.

The fish sedating device 1 is formed by detachably placing a rectangular mat 3 made of a urethane sponge on a rectangular working table 2 made of a resin plate and attaching a pair of electrodes 4a and 4b as a positive electrode and a negative electrode to the mat 3. The mat 3 is one type of fish placement means on which fish is placed according to the present invention. The fish placement means is not limited to the mat 3, but examples may include materials capable of performing an operation for slaughtering a fish F, such as a resin plate, an electrically non-conductive metal, a resin pipe, and a net fabric. The working table 2 is installed and fixed on the deck by legs 2a. The pair of electrodes 4a and 4b is formed such that electricity is supplied thereto from a power source (not illustrated) incorporated into an electrical stimulation generation device 5 through a cable 6. A switch 7 for turning on and off a state where electricity is supplied to the electrodes 4a and 4b and interrupting the supply of electricity in case of emergency is attached to the electrical stimulation generation device 5.

As further described, the working table 2 has a large number of holes 8 penetrating therethrough in a plate thickness direction to exclude water (resistance-reducing water) for reducing an electrical resistance between the electrodes 4a and 4b, as illustrated in FIG. 2. The mat 3 is formed by being elastically deformed and recessed when the fish F is placed thereon to widely contact a lower surface on the placement side of the fish F, as illustrated in FIG. 3. Further, the mat 3 is formed into a porous shape to enable the resistance-reducing water on its upper surface to be easily drained and is formed of a material having water repellency. FIG. 2 illustrates an example in which the mat 3 has a large number of through holes 3a penetrating therethrough in a thickness direction. Further, as water storage prevention means for preventing the resistance-reducing water from being stored by at least the vicinity of the fish F on the mat 3, a mechanism for forcibly removing the resistance-reducing water moderately including the mat 3 and the working table 2 is formed. Specifically, as illustrated in FIG. 2, a drain housing pan 9 having a shape of a container opening upward, which houses resistance-reducing water flowing downward from the large number of holes 8 once, adheres to a lower surface of the working table 2, a drain discharge port 10 for discharging a housed drain is provided in an open manner on a bottom surface of the drain housing pan 9, and a vacuum port 11 for vacuuming is provided in an open manner on a side surface of the drain housing pan 9. A vacuum pump not illustrated is connected to the vacuum port 11.

Then, a function of the present embodiment will be described.

When an operation for slaughtering the fish F is started, the switch 7 is first turned on to supply electricity to the pair of electrodes 4a and 4b.

Then, the fish F is placed on or put into the upper surface of the mat 3. When the fish F is placed on the upper surface of the mat 3, the mat 3 is elastically deformed and is recessed depending on the weight of the fish F to widely contact the lower surface on the placement side of the placed fish F. In this state, the pair of electrodes 4a and 4b energizes the fish F through a moderate amount of water on a surface of the mat 3, to sedate the fish F. The slaughter operation is performed for the sedated fish F. Here, the moderate amount of water on the surface of the mat 3 is water (high-resistance water) in a state present on the mat 3 as the fish placement means and having a higher electrical resistance than that of the fish F, and means a state where an electric current that has been supplied to the pair of electrodes 4a and 4b flows through the high-resistance water and the fish F so that the fish F reliably receives an electric shock.

The foregoing slaughter operation is sequentially performed for each fish F.

When the slaughter operation is performed for a series of fish F, so-called low-resistance water (resistance-reducing water) in a state having a lower electrical resistance than that of the fish F as a collection of a mucosal membrane adhering to a surface of a body of the fish F, a mucosal membrane to be discharged from inside the body of the fish F, and seawater or fresh water to be stored on the mat 3 is stored.

In the present embodiment, the water storage prevention means functions, thereby reliably preventing excess low-resistance water (resistance-reducing water) from being stored on the mat 3.

Specifically, the inside of the drain housing pan 9 is negatively pressurized by the vacuum port 11, whereby excess low-resistance water (resistance-reducing water) in the vicinity of the mat 3 and the fish F is forcibly sucked through a porous portion of the mat 3 and the large number of holes 8 of the working table 2 and is housed in the drain housing pan 9, and is then drained out of the drain housing pan 9 through the drain port 10.

Thus, the water storage prevention means moderately removes the low-resistance water (resistance-reducing water) at least in the vicinity of the fish F on the mat 3. Therefore, the fish F on the mat 3 can be reliably energized and sedated by passing the electrodes 4a and 4b therethrough, thereby making it possible to satisfactorily perform a slaughter operation.

The water storage prevention means may include at least one of being formed by providing a large number of water-passing holes in a thickness direction of the mat 3, being formed by providing the vacuum means 11 for forcibly discharging the resistance-reducing water by the mat 3, and being formed by providing a water-repellent function to the mat 3.

The present invention is not limited to such a configuration, but various changes are possible, as needed. The fish sedating device according to the present invention can of course be not only installed on a fishing boat but also on land.

REFERENCE SIGNS LIST 1 fish sedating device
2 working table
3 mat
4 electrode
5 electrical stimulation generation device (incorporating power source)
6 cable
7 switch
8 hole
9 drain housing pan
10 drain port
11 vacuum port

The invention claimed is:

1. A fish sedating device comprising:
a fish placement part on which a fish can be placed, wherein the fish placement part is non-electrically conductive;
water present on the fish placement part in a state of contacting the fish placed on the fish placement part;
a pair of electrodes to which electricity is supplied through the water;
a power source that supplies electricity to the pair of electrodes, wherein the pair of electrodes are spaced apart from each other on the fish placement part; and
a water storage prevention part for preventing a mucosal membrane of the fish, seawater, or fresh water as resistance-reducing water for reducing an electrical resistance in the water present between the pair of electrodes from being stored, wherein
the fish placement part is formed of a plate-shaped member that has a flat surface having no protrusion in its outer extension and stores the water on the flat surface,
the water storage prevention part is formed of at least one of
a large number of water-passing holes that are provided in a thickness direction of the plate-shaped member in the fish placement part and pass the resistance-reducing water to be stored on the flat surface of the plate-shaped member toward a lower surface of the plate-shaped member, and
a water-repellent function provided to the flat surface of the plate-shaped member, and
the water present on the fish placement part is set as high-resistance water having an amount to be brought into a state having a higher electrical resistance than that of the fish by the water storage prevention part.

2. The fish sedating device according to claim 1, wherein the resistance-reducing water includes at least one of mucus of the fish, seawater, and fresh water.

3. The fish sedating device according to claim 1, wherein the water storage prevention part is formed by providing a vacuum part for forcibly discharging the resistance-reducing water by the fish placement part in addition to at least one of the water-passing holes and the water-repellent function.

4. The fish sedating device according to claim 1, wherein the fish placement part has elasticity and is formed to widely contact a lower surface on the placement side of the placed fish.

5. A fish sedating device comprising:
a fish placement part on which a fish can be placed, wherein the fish placement part is non-electrically conductive;
water present on the fish placement part in a state of contacting the fish placed on the fish placement part;
a pair of electrodes to which electricity is supplied through the water;
a power source that supplies electricity to the pair of electrodes, wherein the pair of electrodes are spaced apart from each other on the fish placement part; and
a water storage prevention part for preventing a mucosal membrane of the fish, seawater, or fresh water as resistance-reducing water for reducing an electrical resistance in the water present between the pair of electrodes from being stored, wherein
the fish placement part is formed of a plate-shaped portion having a flat surface storing the water on its top, and
the water present on the fish placement part is set as high-resistance water having an amount to be brought into a state having a higher electrical resistance than that of the fish by the water storage prevention part, such that electricity to the pair of electrodes on the flat surface of the plate-shaped member energizes and sedates the fish on the flat surface through the high-resistance water.

* * * * *